United States Patent
Snyder et al.

(10) Patent No.: US 12,191,453 B2
(45) Date of Patent: Jan. 7, 2025

(54) LITHIUM-ION BATTERY FORMATION PROCESS

(71) Applicant: FORD GLOBAL TECHNOLOGIES, LLC, Dearborn, MI (US)

(72) Inventors: Kent Snyder, Dearborn, MI (US); Minghong Liu, Taylor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 18/184,974

(22) Filed: Mar. 16, 2023

(65) Prior Publication Data

US 2023/0223600 A1 Jul. 13, 2023

Related U.S. Application Data (62) Division of application No. 17/098,976, filed on Nov. 16, 2020, now Pat. No. 11,631,900.

(51) Int. Cl.
| | |
|---|---|
| *H01M 10/058* | (2010.01) |
| *H01M 10/0525* | (2010.01) |
| *H01M 10/44* | (2006.01) |
| *H01M 50/636* | (2021.01) |

(52) U.S. Cl.
CPC ..... *H01M 10/058* (2013.01); *H01M 10/0525* (2013.01); *H01M 10/44* (2013.01); *H01M 10/446* (2013.01); *H01M 50/636* (2021.01)

(58) Field of Classification Search
CPC ............. H01M 10/058; H01M 50/636; H01M 10/0525; H01M 10/44; H01M 10/446
See application file for complete search history.

(56) References Cited

U.S. PATENT DOCUMENTS

| | | |
|---|---|---|
| 2013/0149477 A1 | 6/2013 | Minelli |
| 2014/0266066 A1 | 9/2014 | Turon Teixidor et al. |
| 2017/0101582 A1 | 4/2017 | Gotoh et al. |
| 2021/0226246 A1 | 7/2021 | Yun et al. |

FOREIGN PATENT DOCUMENTS

| | | |
|---|---|---|
| CN | 105406130 A | 3/2016 |
| CN | 105958123 A | 9/2016 |
| CN | 105406130 B | 11/2017 |
| CN | 108808102 A | 11/2018 |
| CN | 109728354 A | 5/2019 |
| CN | 208904164 U | 5/2019 |
| JP | 2013149477 A | 8/2013 |
| KR | 10-2017-0101582 A | 9/2017 |

OTHER PUBLICATIONS

CN105406130B—Machine Translation (Year: 2016).*

* cited by examiner

*Primary Examiner* — Brian R Ohara
*Assistant Examiner* — Patrick Marshall Greene
(74) *Attorney, Agent, or Firm* — David B Kelley; Brooks Kushman P.C.

(57) ABSTRACT

A method of producing a lithium-ion battery includes filling at least one cell of the battery with an electrolyte followed directly with a first step of sealing the at least one cell and a second step of applying pulsating compression to the at least one cell during formation charging, the pulsating compression comprising alternating a first time period of applying a first compression force $F_1$ greater than zero and a second time period of applying a second compression force $F_2$, wherein $F_1 > F_2$, and the formation charging includes a first charge of the battery.

7 Claims, 6 Drawing Sheets

100 – Cell components manufacturing

102 – Cell components assembly

104 – Electrolyte filling

106 – Wetting and soaking

108 – Sealing

110 – Formation

(PRIOR ART)

300 – Cell components manufacturing

302 – Cell components assembly

304 – Electrolyte filling and cell sealing

306 – Pulsating compression and formation of the cell

FIG. 4B

400 – Cell components manufacturing

402 – Cell components assembly

404 – Stacking individual cells in an array

406 – Electrolyte filling and cell sealing

306 – Pulsating compression and formation of the stack/array

LITHIUM-ION BATTERY FORMATION PROCESS

CROSS-REFERENCE TO RELATED APPLICATIONS

This application is a division of U.S. application Ser. No. 17/098,976 filed Nov. 16, 2020, now U.S. Pat. No. 11,631,900, issued Apr. 18, 2023, the disclosure of which is hereby incorporated in its entirety by reference herein.

TECHNICAL FIELD

The disclosure relates to a process of forming lithium-ion batteries utilizing compression.

BACKGROUND

Lithium ion batteries present a rechargeable electrochemical storage technology. Due to the electrochemical potential and capacity provided by the lithium ion batteries, the technology shows promise regarding electrification of the drivetrain and providing stationary storage solutions to enable effective use of renewable sources of energy. Lithium ion batteries produce electricity utilizing a cathode, an anode, and an electrolyte which connects and separates the two electrodes. Lithium ions migrate via the electrolyte from one electrode to the other while associated electrons are being collected by current collectors and may serve as an energy source for an electric device. The manufacturing process of lithium ion batteries can be relatively costly, lengthy, and includes various process steps.

SUMMARY

In at least one embodiment, a method of producing a lithium-ion battery is disclosed. The method may include filling at least one cell of the battery with an electrolyte followed directly by sealing the at least one cell and then applying pulsating compression comprising alternating a first time period of applying a first compression force greater than zero and a second time period of applying a second compression force lower than the first compression force, and the formation charging including a first charge of the battery. The application of the pulsating compression and formation charging may be simultaneous. The method may be free of cell soaking prior to the sealing of the cell. The at least one cell may include a plurality of cells stacked in an array. The at least one cell includes a plurality of components and the method may also include wetting of the plurality of components with the electrolyte during the pulsating compression. The pulsating compression may be applied for an entire duration of the formation charging. The first and second time periods may have a same length.

In another embodiment, a lithium-ion battery cell production method is disclosed. The method may include assembling individual components of the lithium-ion battery cell; filling the cell with electrolyte and sealing the cell; initiating formation charging immediately after the scaling step; and applying pulsating compression to the sealed cell to wet the individual components of the cell during the formation charging. The cell may be a pouch cell or a prismatic cell. The pulsating compression may include at least one repetition of a first time period of applying a first compression force greater than zero against at least two surfaces of the cell and a second time period of applying a second compression force, lower than the first compression force, against the at least two surfaces of the cell. A length of the first time period and a length of the second time period may be the same. A length of the first time period and a length of the second time period may increase with each repetition. The method may lack a step of utilizing vacuum after the cell is filled with the electrolyte. The method may be free of a step of soaking the cell after the cell is filled with the electrolyte and before the cell is sealed.

In yet another embodiment, a method of a lithium-ion battery manufacturing is disclosed. The method may include, during a first charge of a lithium-ion battery cell, that is sealed and filled with electrolyte, applying a compression force to at least two surfaces of the cell for a first time period and releasing the compression force for a second time period. The first time period and the second time period may have a same length. A value of the compression force during the first time period may be constant. The applying and releasing of the compression force may repeat periodically. Each subsequent applying and releasing of the compression force may last longer than a previous applying and releasing of the compression force. The method may also include wetting of individual cell components with the electrolyte during the first charge.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the disclosure can be obtained within a range of ±5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Any two numbers, of a set of numbers, may form an integer range. For example, if the disclosed numbers are 1, 2, 3, 4, 5, the range the numbers cover may be 1 to 5, 1 to 3, 2 to 4, 3 to 4, among other options.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

A lithium-ion battery is a rechargeable battery used in consumer electronics such as portable electronics as well as in battery electric vehicles, stationary energy storage systems, and aerospace applications. The lithium-ion battery has a relatively high energy density, small memory effect, and low self-discharge. An additional advantage of the lithium-ion battery is its low weight.

Figure 1:
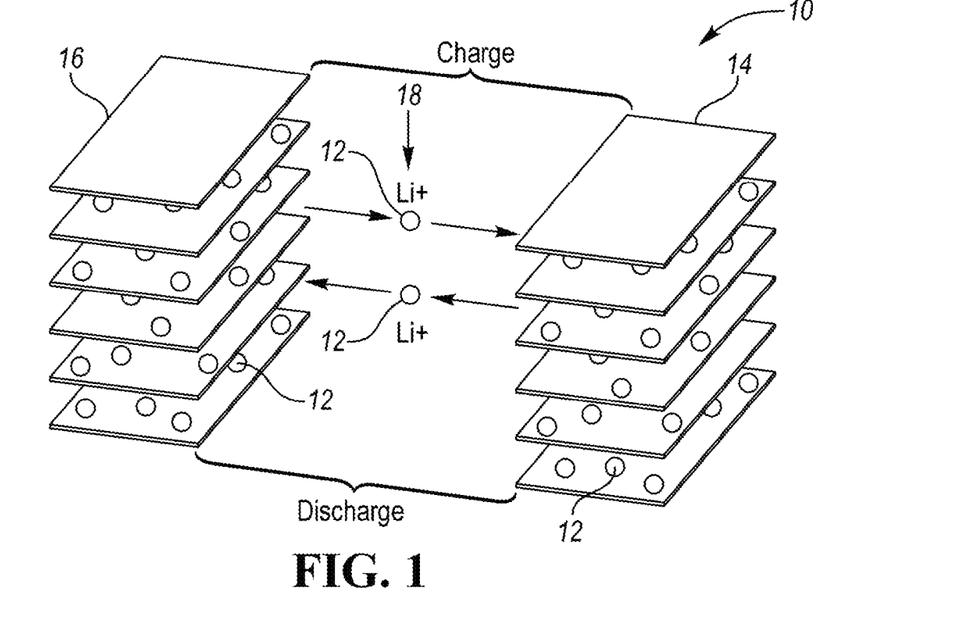
FIG. 1 depicts a schematic diagram of the lithium ion migration through an electrolyte during charge and discharge and the intercalation principle within a lithium ion battery cell in accordance with one or more embodiments.

Each lithium-ion battery includes two electrodes, the anode and the cathode, a non-aqueous electrolyte which enables ionic movement of lithium between the two electrodes, and a separator membrane. As is schematically depicted in FIG. 1, the electrodes have open or porous structures allowing for an insertion and extraction of lithium ions as well as accepting compensating electrons at the same time. The principal of the lithium-ion rechargeable battery 10 thus lies in migration of the lithium ions 12, which carry the current, from the anode 14 to the cathode 16 during discharge. During charge, an external electrical power source (not depicted) applies an over-voltage to the cell 10, forcing the electric current to pass in the reverse direction. The lithium ions 12 thus migrate via electrolyte 18 from the cathode 16 to the anode 14, where they are stored in the anodic material 14. This mechanism, incorporating intercalation, includes the insertion of lithium ions into the structure of the electrodes 14, 16 without changing the electrodes' structures.

Several types of lithium-ion batteries have been developed. Exemplary types include batteries based on cathodes containing lithium cobalt oxide ($LiCoO_2$), lithium ion phosphate ($LiFePO_4$), lithium manganese oxide (LiMnO), lithium nickel manganese cobalt oxide ($Li(Ni_xMn_yCo_{1-x-y})O_2$), or the like. Unlike lithium metal batteries, the lithium-ion batteries typically use graphite as the active material in the anode, which intercalates lithium ions. Other active materials and electrolytes have been developed.

Regardless of the battery's specific chemistry, lithium ion battery cells and stacks may include various housing designs such as cylindrical cells, prismatic cells, or pouch cells. Cylindrical cells include a tubular cylindrical housing protecting the battery components. A prismatic cell typically features a rectangular can for its containment and electrodes which are either stacked or formed into a flattened spiral. Pouch cells utilize a flexible, metallized film structure to house the battery components.

The manufacturing process for lithium ion batteries is relatively time-consuming and may take up to one month from start to completion. The production of a lithium-ion battery typically has three main stages: (1) electrode manufacturing, (2) cell assembly, and (3) cell finishing. During the electrode manufacturing (1), the anode, cathode, and separator are formed by various techniques such as dry mixing or dispersing/wet mixing of active materials, binders, solvents, and/or additives to form the individual components followed by extrusion, coating, drying, calendaring, slitting, vacuum drying, the like, or a combination thereof.

The stage of cell assembly (2) depends on the type of the housing used, but generally includes a step of separation of the anode, cathode, and separator sheets from roll materials, cutting to produce individual sheets, winding or stacking of the individual sheets, and fixing the stacks or wound assembly with an adhesive tape. The next step may include packaging which includes connecting the cell tabs with current collector foils using ultrasonic or laser welding and positioning the cell stack in a pouch-type housing which is sealed on three sides, leaving one side unsealed for filling with an electrolyte. The pouch may be formed from a relatively thin foil.

Subsequently, the cell stack is filled with electrolyte. The electrolyte filling includes providing the electrolyte into the cell to partially fill the cell which can be done, for example, under vacuum with the help of a dosing instrument. The electrolyte needs to wet the separator, soak in, and wet the electrodes. The cell is typically evacuated and partially filled several times and/or put into a rest/soaking period to achieve the wetting, which may take up to anywhere from about 12 hours to 3 days before the housing may be sealed.

Only after the prolonged wetting and soaking process is completed, the sealed cell is finished (3) which typically includes the step of formation. Formation describes the first charging and discharging processes according to predetermined current and voltage curves. Typically, cell finishing also includes degassing to remove any excess gas formed as a result of the first charge. The cell then undergoes aging and testing.

Figure 2:
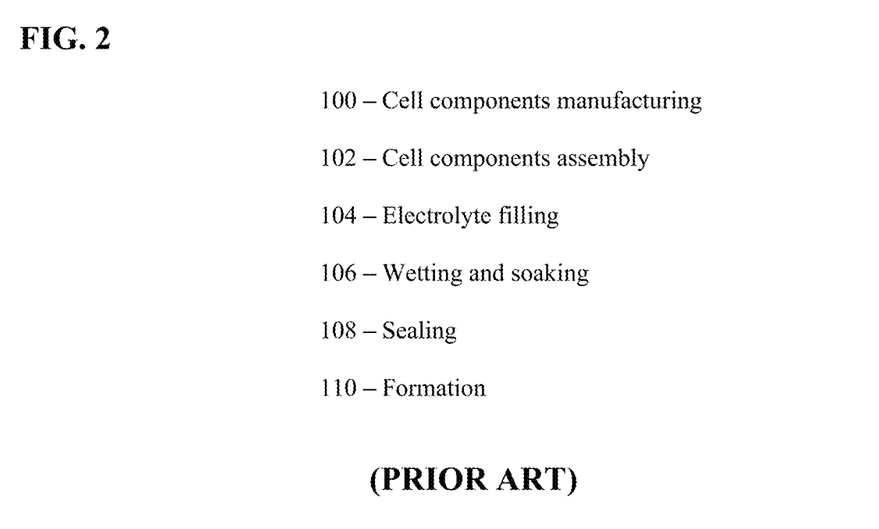
FIG. 2 depicts a schematic succession of prior art lithium-ion battery cell manufacturing steps.

A schematic depiction of the steps is shown in FIG. 2. As can be seen in FIG. 2, the step 100, cell components manufacturing of stage (1) described above, is followed by step 102, cell components assembly of stage (2). The cell is then typically filled with electrolyte at step 104, which is followed by a time-consuming process of wetting and soaking of the internal components of the cell with electrolyte at step 106. Step 108, formation, is initiated only after completion of step 106.

As is apparent, the lithium ion battery manufacturing requires a multitude of steps including the lengthy soak process, which may be one of the longest lasting steps, and which is therefore a key determining factor in the battery manufacturing.

Simplification of the manufacturing process without significantly affecting battery functionality has been a challenge. For example, to speed up the wetting and soaking step, vacuum has been applied and released. But applying vacuum may alter the quantity and quality of the electrolyte as electrolyte infiltration progresses. Such changes both to quantity and quality of the electrolyte are undesirable. Additionally, it is difficult to control vacuum application to a cell stack, which may result in uneven wetting of the components within individual cells of the stack. The uneven wetting may in turn result in lower efficiency of the battery.

Yet, it would be very desirable to achieve reduced cycle time of lithium ion cell manufacturing. A more time-efficient production method would also result in lower manufacturing costs and related manufacturing capital costs while at the same time improving efficiency and contributing to lean manufacturing principles.

In one or more embodiments, a process of manufacturing of an ion lithium battery cell and/or associated cell stack is disclosed. The cell may be a lithium-based cell including a cell having various chemistries, for example such as was described above. The cell may have a housing including a prismatic, cylindrical, or pouch format, as was described above.

The process may include the stage of: (1) electrode manufacturing, (2) cell assembly, and (3) cell finishing. Each stage may include one or more steps. The stage of (1) electrode manufacturing may include one or more steps described above. The method disclosed herein includes one or more modified steps of stages (2) and (3). Specifically, the traditional prolonged soaking of the cell in stage (2) is eliminated or significantly reduced. The requirement of filling the cell with the electrolyte in stage (2) in vacuum is eliminated, reduced, or significantly reduced, or the cell is filled with the electrolyte under vacuum, but vacuum is not applied after the filling is completed. Immediately following the filling of the cell with the electrolyte, the cell is sealed and formation charging of stage (3) begins. During the formation step, compression is applied.

Specifically, the method may include one or more steps of electrode manufacturing of stage (1) including sealing the edges on three sides of the cell and leaving a single side of the cell unsealed. The stage (1) is followed by electrolyte filling of stage (2) conducted before formation of the cell finishing stage (3). During stage (2), the assembled cell is filled with electrolyte. The filling may be provided via an opening in the cell formed during stage (1).

The filling step of stage (2) may be conducted under atmospheric pressure, elevated pressure, or applied vacuum. The filling step may involve a reduced magnitude of vacuum compared to traditional filling methods or may not involve any application of vacuum. Vacuum relates to a space from which the ambient atmosphere has been partially removed so that the matter or gas remaining in the space exerts less pressure then the atmosphere.

The filling step of stage (2) may include putting an amount of electrolyte into the volume of the cell. The entire amount of electrolyte may be provided into the cell at the same time, in one stage, or in a plurality of stages. The amount of electrolyte may be a predetermined amount, a metered amount, a final amount of electrolyte which is to be metered into the cell. Once the metered amount is provided into the cell, the cell may be sealed to prevent egress of the electrolyte from the cell or ingress of the ambient atmosphere into the cell.

Subsequently, after the filling and the sealing step, the cell is advanced into stage (3), formation charging. During the formation charging, the cell is subjected to compression. The formation charging under compression may follow immediately after the filling and the sealing step. The formation step and the compression step may be conducted at least partially or fully at the same time, be occurring at the same time, coincide in time, be contemporaneous, simultaneous.

The formation step includes compression. Compression is part of the formation step. Compression may be pulsating compression including at least one time period of compression and at least one time period of no compression or compression significantly lower than the initial compression, as is explained below. Pulsating refers to having a repetition, rhythm, or alternating pattern. The compression may be a periodical compression. The compression may be applied and released periodically. The length of the period, including compression application and release, may be constant, increase, or decrease during the formation step. In other words, each subsequent applying and releasing of the compression force lasts the same, longer, or shorter amount of time than the previous applying and releasing of the compression force.

The compression step may last for the entire duration of the formation step such that the compression process described herein starts and ends at the same time as the formation process. Alternatively, the compression step may overlap the formation step only partially. For example, the compression and formation processes may start at the same time, but the compression process or step may end before the formation process ends.

Figure 3:
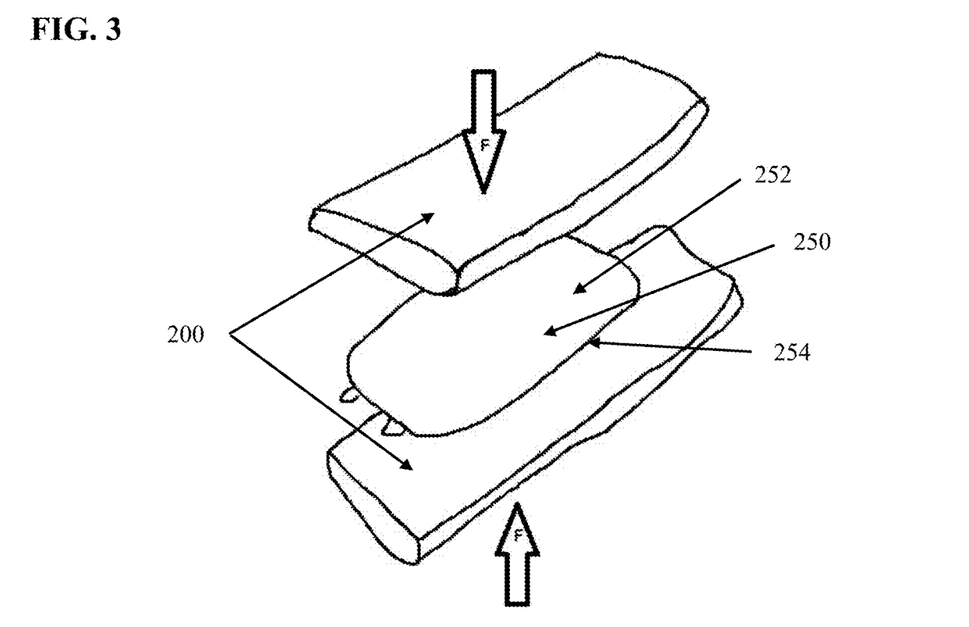
FIG. 3 shows schematically a non-limiting example of compression plates arranged to apply pressure to a cell during formation step of the manufacturing process described herein.

The compression may be provided, for example, by a set of compression plates which the cell may be placed in between. A non-limiting example of the compression plates is depicted in FIG. 3. As can be seen in FIG. 3, the plates 200 are being pressed against the pouch cell 250. The plates 200 may be, for example, metallic plates. The set of compression plates 200 may include at least two compression plates. The ser of compression plates 200 may include more than 2 plates such as 4, 6, 8, 10, or more plates. The plates 200 may have any size and/or configuration as long as the plates are capable of asserting pressure against at least two surfaces of the cell 250. The surfaces may be opposing surfaces of the cell such as a top surface 252 and bottom surface 254 of the cell. Alternatively, the surfaces may include more than two surfaces of the cell 250.

The cell may be in contact with the plates during the entire duration of the compression step or during a portion of the compression step. The compression step may include asserting a variable amount of pressure against the cell during a time period. The compression may include applying a compression or compressive force F, which occurs when a physical force presses inward on an object, causing the object to become compacted, against the cell surfaces. The applying and releasing of the compression force repeats periodically. The period may have a constant value or have a greater or smaller value as the formation charging progresses.

During the compression step, the amount of the first compression force $F_1$ is applied against the cell surfaces. $F_1$ is greater than 0 but lower than an amount of force which would compromise integrity of the cell Fp. The amount of the first compression force $F_1$ may be the same or different against each surface. The amount of force $F_1$ may be applied for a first time period A. Subsequently, the first compression force $F_1$ may be lowered such that an amount of the second compression force $F_2$ is applied against the surfaces, where $F_1 > F_2$. The amount of force $F_2$ may be applied for a second time period B. The first and second time periods A and B may have the same or different length. For example, the first time period A may be greater than the second time period B. The time periods A, B, or both may last a few milliseconds to several seconds, minutes, or hours. The time periods A, B, or both may be constant during the formation process. The time periods A and B may alternate or repeat at least once to several times up to several hundreds or thousands of times during the compression step. Each repetition may be the same or different with respect to length, amount of force applied, and other conditions, than the previous repetition.

For example, the compression step may have constant values of at least one of or all of $F_1$, $F_2$, A, and B. In a non-limiting example, $F_1$ is a value 100 times greater than value $F_2$. $F_2$ may be about 5 psi. Both A and B may be about 10 s.

In an alternative embodiment, a third time period C may be introduced between the time periods A and B. During the time period C, the amount of pressure $F_1$ may be gradually lowered to the amount of compression $F_2$. Practically, the amount of force $F_1$ is held for a time period A, the amount of force $F_1$ is subsequently gradually changed during a time period C until the amount of force $F_2$ is achieved and held for a time period B. At the end of the time period B, the amount of pressure $F_2$ may be either suddenly changed to the amount of $F_1$ or gradually increased during a fourth time period D until the amount of force $F_1$ is achieved. The time periods C and D are transition periods. The transition periods may have the same or different length. The transition periods may last several milliseconds to several seconds or minutes. The transition periods may have the same length as at least one of the periods A and B or both A and B.

The time periods A, B, C, and D may have the same or different values for each cycle or repetition. For example, $A_1 = B_1$ such as $A_1$ lasts $x_1$ seconds and $B_2$ lasts $x_1$ seconds, followed by $A_2$ and $B_2$ which both last $x_2$ seconds, followed by $A_3$ and $B_3$ which both last $x_3$ seconds. The value of x may be increasing, decreasing, or fluctuating with each period or cycle. For example, $x_1 < x_2 < x_3$ such that A and B last longer as the formation process progresses. In other words, compression force is applied and released for a longer time period as the charging process progresses.

Non-limiting example values of time periods A, B, C, and/or D may be about 1 to 120, 5 to 60, or 10 to 20 s. The non-limiting example values of time periods A, B, C, and/or D may be about 1, 2, 3, 4, 5, 6, 7, 8, 9, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, or 120 s, or any range between any of the two numbers named herein. Non-limiting example values of $F_2$ may be 0, 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20 psi, or more, or any range between any of the two numbers named herein. Non-limiting example values of $F_1$ may be 2, 5, 10, 15, 20, 25, 30, 40, 50, 60, 70, 80, 90, 100, 125, 150, 175, 200, 250, 300, 350, 400, 450, 500, 550, 600, 650, 700, 750 or more times greater than the value of $F_1$.

The amount of compression force F, frequency of applying compression, and profile may be optimized based on the requirements of the specific application, battery chemistry, design, construction, mechanical properties of each component, the like, or a combination thereof.

The compression step includes periodically applying and removing/releasing compression force against the surfaces of the cell. Effectively, the repeated application and release of compression force F against the cell surfaces enables the electrolyte to penetrate the cell structure, wet the separator and the electrodes in a faster manner than a process which provides no compression or constant compression during the formation step. Without limiting the application to a single theory, it is presumed that as the amount of force exerted against the cell surfaces increases, more contained gas is squeezed out to the pores in the electrode materials. When the force is removed/reduced, the liquid electrolyte is forced into the cell pores by the vacuum created in the pores. The mechanism may be comparable to squeezing of a sponge under water to push out air contained in the sponge and then absorbing a larger amount of water in, in contrast to a scenario in which the sponge is simply placed statically underwater with no externally applied compression force.

The herein disclosed process may thus implement pulsating compression functioning as a "squeezing a submerged sponge" type of a mechanism. During the pulsating compression, the mechanism may favorably direct trapped gases during the period of applied compression force to the surfaces of the cell followed by providing a driving force to increase electrolyte absorption and impregnation when the compression level is reduced and/or released.

At the end of the formation process, the cell is discharged. The compression step ends before the discharge begins. The cell may be subjected to additional steps of a typical stage (3) manufacturing process such as degassing, cell testing, quality control checks, the like, or a combination.

The cell manufacturing process described herein presents several advantages. Firstly, the process is more efficient than traditional formation techniques because (a) the prolonged soaking step after the cell is filled with electrolyte may be eliminated or significantly reduced, and (b) the formation process may be initiated and performed right after the cell is filled with electrolyte and sealed. Secondly, the quality and quantity of the electrolyte is not compromised because vacuum during the electrolyte filling process may be eliminated or significantly reduced. The reduction may relate to the length of vacuum application or magnitude. The process may thus result in a cell of higher performance, significant decrease in unit manufacturing time, and increased production capacity.

An additional advantage of the disclosed process is the ability to manufacture a stack of cells, instead of just a single cell, by the disclosed method. The pressure may be applied to a stack or a plurality of cells at the same time. This is in contrast to, for example, a method utilizing vacuum application which presents a challenge with respect to more than one cell as it is relatively difficult to control and determine whether the optimal degree and duration of vacuum is applied to the cell. Application of pulsating pressure is relatively simple to control and adjust with one and more cells forming a stack in an array.

Figure 4A:
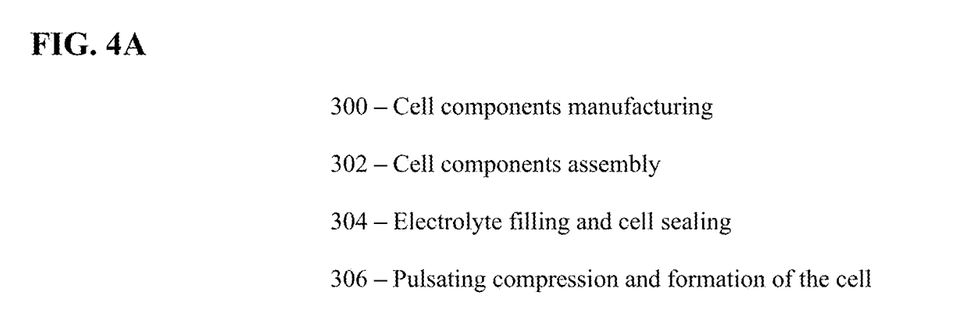
FIGS. 4A and 4B depict schematic succession of steps in the manufacturing processes of a cell and a stacked array of cells, respectively, described herein.

FIG. 4A schematically summarizes the steps of the process disclosed herein. In step 300, electrodes and other components of the cell are manufactured including but not limited to dry mixing or dispersing/wet mixing of active materials, binders, solvents, and/or additives to form the individual components followed by extrusion, coating, drying, calendaring, slitting, vacuum drying, the like, or a combination thereof. In step 302, the cell components are assembled which may include separating components from roll materials, cutting individual sheets from the materials, stacking or winding of sheets, fixing stacks with adhesives, packaging by contacting cell tabs with current collectors, positioning the components in the housing such as a foil pouch, and sealing the housing in preparation for electrolyte filling. Sealing may be provided on all but one sides via which the electrolyte may be inserted into the cell.

In step 304, the cell is filled with electrolyte and sealed. The sealing may be conducted immediately following the filling. In step 306, following immediately after step 304, the cell is subjected to pulsating compression and formation. The formation and pulsating compression may be simultaneous. The formation process includes initial charge and discharge of the cell.

Figure 4B:
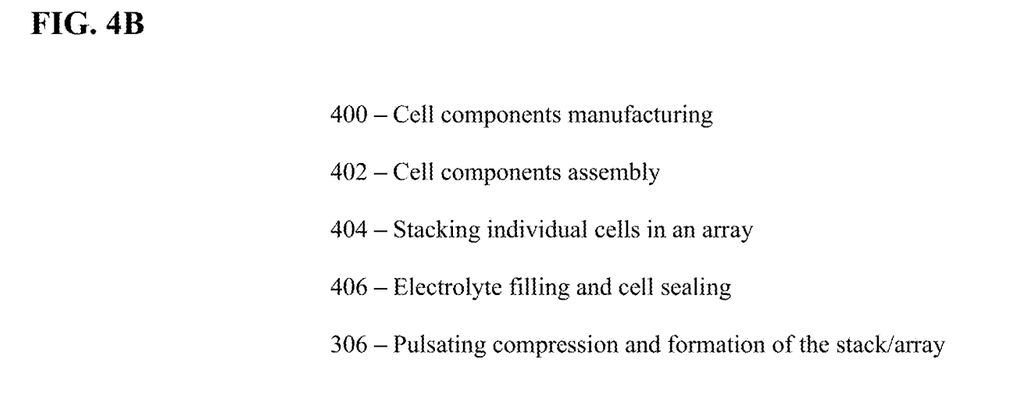

Additionally, the process is also applicable to cell stacks, as is schematically shown in FIG. 4B. Steps 400 and 402 are the same as steps 300 and 302 as described above. In step 404, individual cells are stacked in an array. Subsequently, each cell in the array is filled with electrolyte and sealed in step 406. Alternatively, the electrolyte filling and sealing step 406 may be performed before the individual cells are stacked in an array at step 404. In step 408, following step 404 or 406, the entire array/stack is subjected to simultaneous compression and formation.

EXAMPLES

Example 1 and Comparative Examples I and II

Three identical cells of Example 1 and Comparative Examples I and II were manufactured by preparing and assembling individual components including the anode, cathode, and separator to form the cells according to stage (1). The cells were dried under vacuum for 24 hours at 90° C. During stage (2), the cells of Example 1 and Comparative Examples I and II were filled with electrolyte under vacuum for 30 s and sealed immediately afterwards. Subsequently, formation step of stage (3) began at 0.2 C until 4.2 V. Comparative Example 1 was exposed to zero compression during the formation process. Comparative Example II was subjected to a constant value of compression $F_x$ during the formation process. Example 1 was subjected to pulsating compression or periodical changes with respect to applied and released pressure, as is shown in Table 1 below. The value of compression force $F_x$ applied to Example 1 was the same as the value of $F_x$ applied to Comparative Example II.

TABLE 1

Values of A and B during the formation process for Example 1

| Progression of the formation process | Compression time period A | Compression time period B |
| --- | --- | --- |
| 0 to 30 min | 10 s | 10 s |
| 31 to 60 min | 30 s | 30 s |
| 61 min to 5 h | 0.5 h | 0.5 h |

Figure 5:
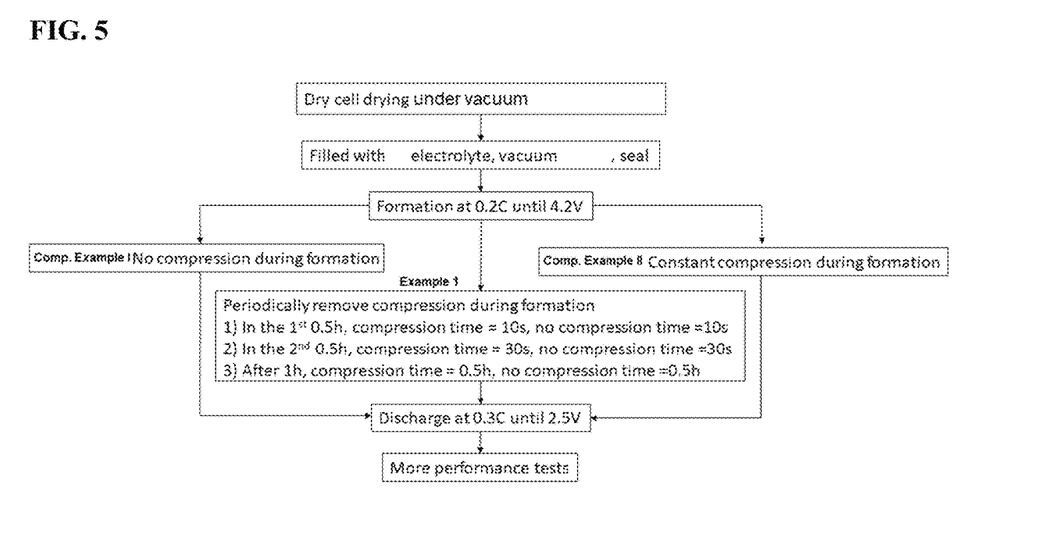
FIG. 5 shows a summary of manufacturing steps used to produce cells of Example 1 and Comparative Examples I and II.

After the charge, the cells of Example 1 and Comparative Examples I and II were discharged at 0.3 C until 2.5V. The summary of the process steps is schematically depicted in FIG. 5.

Figure 6A:
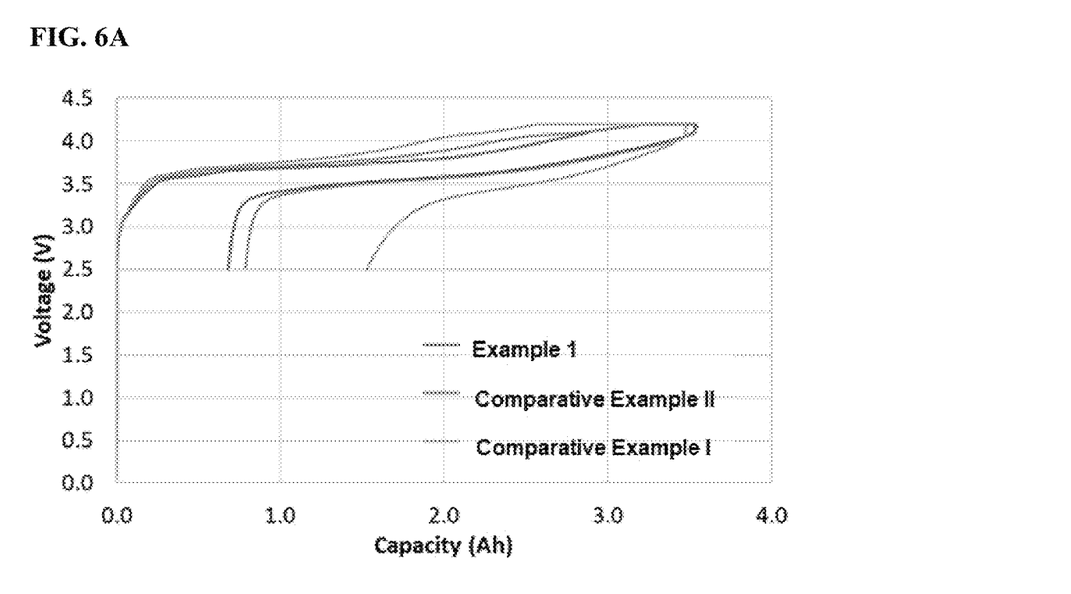
FIG. 6A is a plot of capacity versus voltage during formation cycle of Example 1 and Comparative Examples I and II.
Figure 6B:
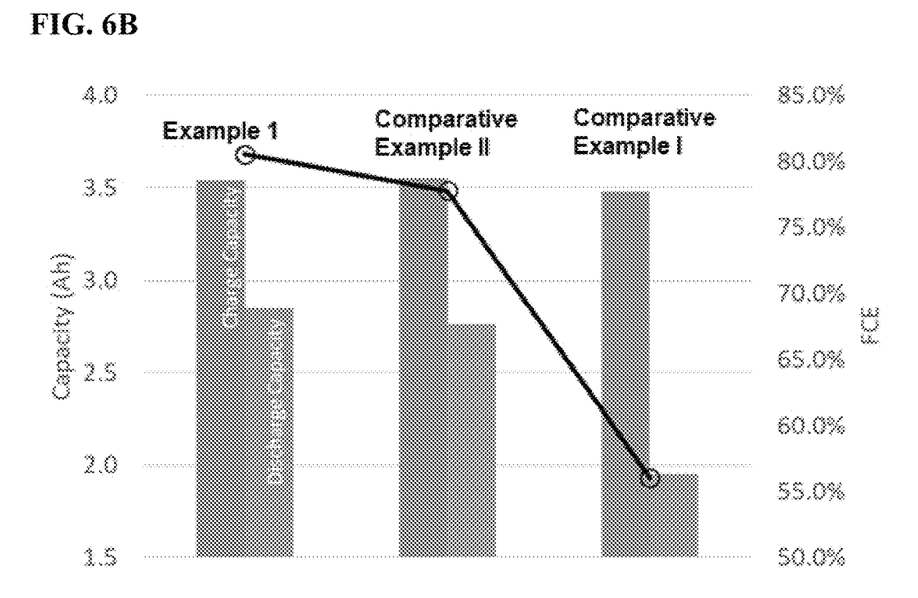
FIG. 6B is a graph showing First Cycle Efficiency (FCE) of Example 1 and Comparative Examples I and II.

The cells of Example 1 and Comparative Examples I and II were tested to assess quality of the cells during and after the formation process. In a first test, capacity and efficiency of each cell was assessed during the first charge and discharge of the cells. Generally, it is desirable that the charge and discharge capacities are as close as possible to the desired, predetermined, and/or designed capacity and first cycle efficiency (FCE). As can be seen in the plot of FIG. 6A and graph of FIG. 6B, Example 1 had the highest discharge capacity and FCE compared to the Comparative Examples I and II. The line cutting across the graph of FIG. 6B in a downward manner refers to FCE and was calculated by dividing the discharge capacity by the charge capacity.

Figure 7A:
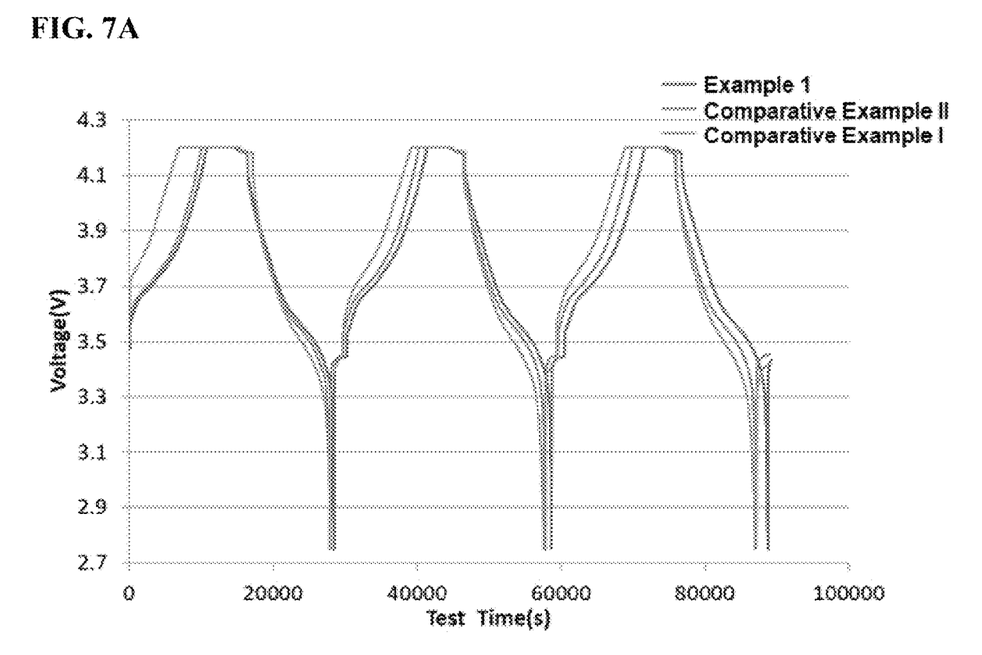
FIG. 7A is a plot of test time versus voltage during first three cycles after formation for Example 1 and Comparative Examples I and II.
Figure 7B:
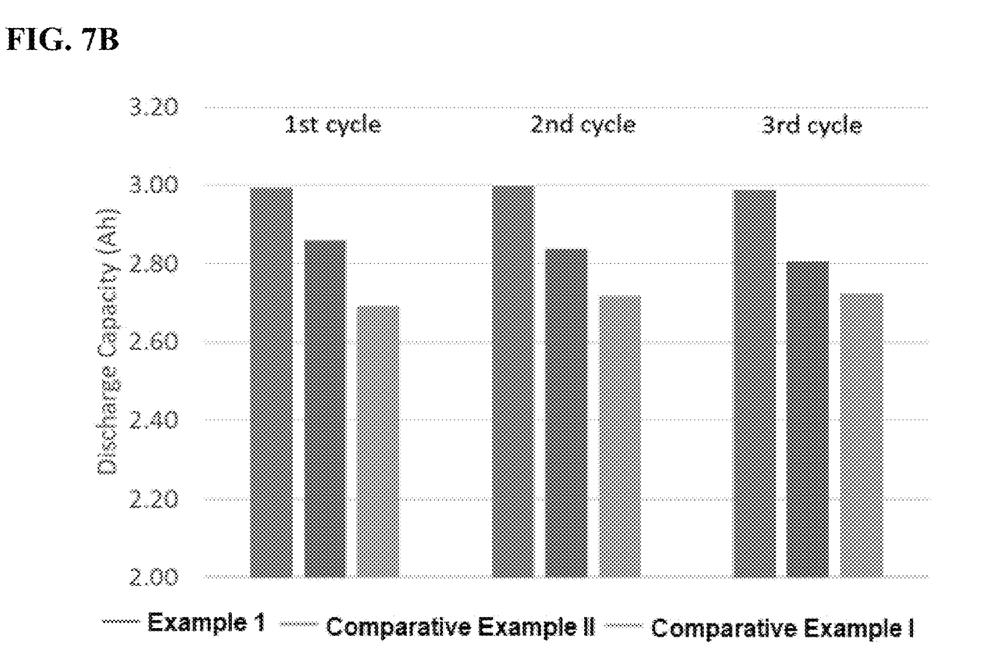
FIG. 7B is a graph showing discharge capacity in the first to third cycles for Example 1 and Comparative Examples I and II.

The three cells were also assessed during regular cycling after formation. The cells of Example 1 and Comparative Examples I and II were tested in three 0.3 C/0.3 C cycles after formation. As can be seen from FIGS. 7A and 7B, Example 1 exhibited lower impedance (slower voltage increase) and capacities the same as the designed capacity. In contrast, Comparative Examples I and II showed much lower capacities, indicating higher impedance and/or partially inactivated materials.

Figure 7C:
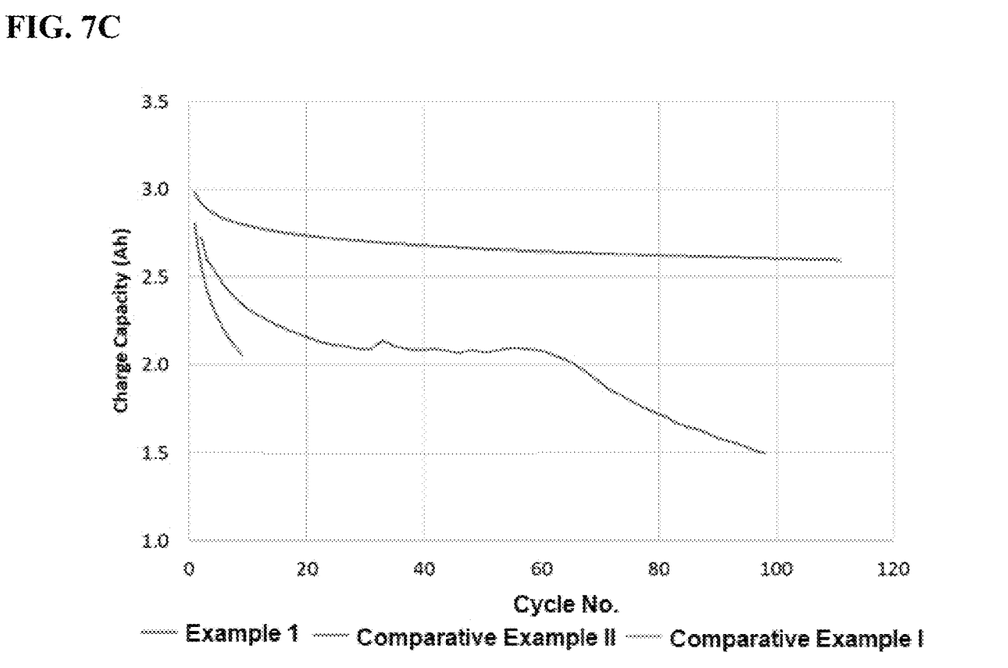
FIG. 7C is a plot of regular cycling in cycle numbers versus charge capacity for Example 1 and Comparative Examples I and II.
Figure 7D:
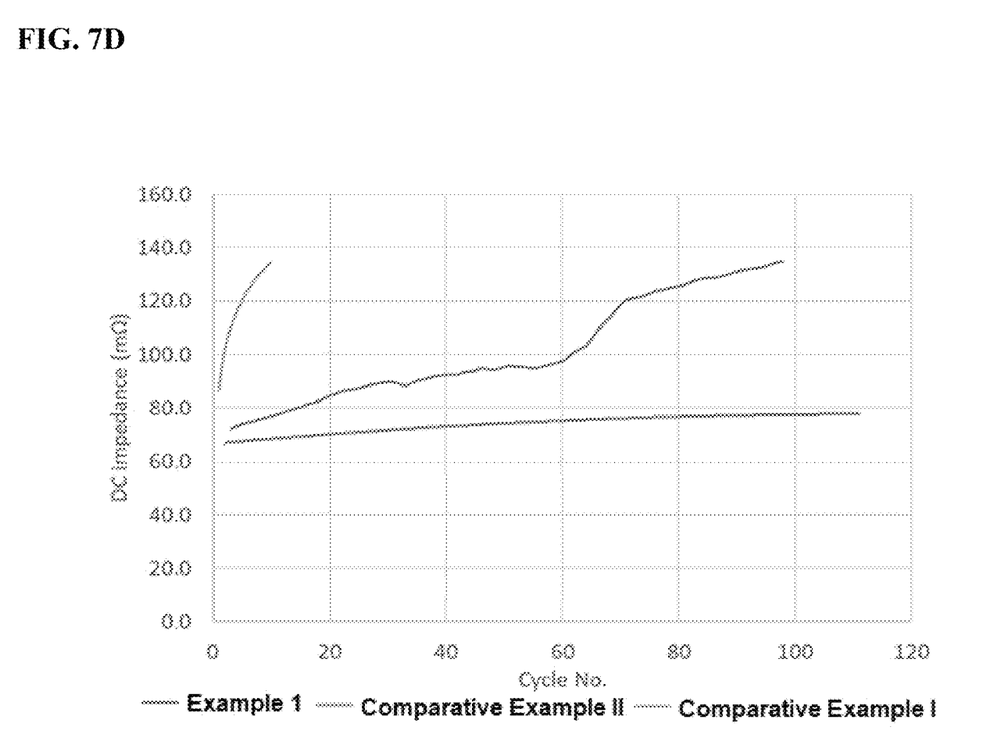
FIG. 7D is a plot of regular cycling in cycle numbers versus DC Impedance for Example 1 and Comparative Examples I and II.

FIG. 7C shows capacity retention of cycling (1 C/1 C). As can be seen in FIG. 7C, Example 1 had a higher capacity retention then Comparative Examples I and II. FIG. 7D shows DC impedance of the cells during cycling (1 C/1 C). Example 1 showed the slowest impedance increase. In contrast, Comparative Examples I and II exhibited relatively rapid increases in DC impedance.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications

What is claimed is:

1. A method of producing a lithium-ion battery, comprising:
   filling at least one cell of the battery with an electrolyte followed directly by sealing the at least one cell and then applying pulsating compression to the at least one cell during formation charging, the pulsating compression comprising alternating repetitions between applying a first compression force greater than zero for a first time period and applying a second compression force lower than the first compression force for a second time period, and the formation charging including a first charge of the battery.

2. The method of claim 1, wherein application of the pulsating compression and formation charging are simultaneous.

3. The method of claim 1, wherein the method is free of cell soaking prior to the sealing of the cell.

4. The method of claim 1, wherein the at least one cell includes a plurality of cells stacked in an array.

5. The method of claim 1, wherein the at least one cell includes a plurality of components, the method further comprising wetting of the plurality of components with the electrolyte during the pulsating compression.

6. The method of claim 1, wherein the pulsating compression is applied for an entire duration of the formation charging.

7. The method of claim 1, wherein the first and second time periods have a same length.

* * * * *